United States Patent [19]

Osanai

[11] 4,383,282
[45] May 10, 1983

[54] CAPSTAN DRIVE TYPE MAGNETIC RECORDING TAPE DRIVE APPARATUS

[75] Inventor: Akira Osanai, Hachioji, Japan

[73] Assignee: Olympus Optical Co., Ltd., Tokyo, Japan

[21] Appl. No.: 180,391

[22] Filed: Aug. 22, 1980

[30] Foreign Application Priority Data

| Aug. 30, 1979 | [JP] | Japan | 54-110725 |
| Aug. 30, 1979 | [JP] | Japan | 54-110726 |
| Aug. 30, 1979 | [JP] | Japan | 54-110727 |
| Aug. 30, 1979 | [JP] | Japan | 54-110728 |

[51] Int. Cl.³ .................. G11B 15/00; G11B 17/00
[52] U.S. Cl. .................................. 360/96.3; 360/74.1
[58] Field of Search .................. 360/96.3, 96.2, 96.4, 360/74.1, 74.2, 105, 137; 242/197–200

[56] References Cited

U.S. PATENT DOCUMENTS

| 4,210,944 | 7/1980 | Fushimi et al. | 360/74.2 |
| 4,291,348 | 9/1981 | Pera | 360/96.2 X |
| 4,305,103 | 12/1981 | Osanai | 360/74.1 X |
| 4,309,727 | 1/1982 | Osanai | 360/74.1 X |

FOREIGN PATENT DOCUMENTS 2557519 8/1976 Fed. Rep. of Germany .
2722713 8/1977 Fed. Rep. of Germany .
2903576 2/1979 Fed. Rep. of Germany .

OTHER PUBLICATIONS

"Tape Recorder", 1960, pp. 110–111, Publ.: Japan Broadcasting Publ. Assoc.

Primary Examiner—John H. Wolff
Attorney, Agent, or Firm—Frishauf, Holtz, Goodman & Woodward

[57] ABSTRACT

A capstan drive type magnetic recording tape drive apparatus of this invention has a swinging member which is swingably mounted to a chassis of the apparatus. The swinging member rotates in one direction when a magnetic recording tape wound around a pair of reels engages a pair of reel shafts of the apparatus travels in one direction, and engages with one of a pair of slipping members rotatably mounted and selectively coupled to the pair of reel shafts by a frictional engagement, and prohibits rotation of the slipping member. The swinging member rotates in the other direction when the tape travels in the other direction, and engages with the other of slipping members, and prohibits rotation of the slipping member. To prohibit the rotation of one of the slipping members causes a backtension of constant strength, and eliminates wow and flutter.

8 Claims, 7 Drawing Figures

CAPSTAN DRIVE TYPE MAGNETIC RECORDING TAPE DRIVE APPARATUS

BACKGROUND OF THE INVENTION

The present invention relates to a capstan drive type magnetic recording tape drive apparatus and, more particularly, to a capstan drive type magnetic recording tape drive apparatus using a cassette tape called a micro-cassette.

In a conventional capstan drive type magnetic recording tape drive apparatus of the type described, when the magnetic recording tape of the micro-cassette travels in one direction, one of a pair of reel shafts becomes the shaft of a take-up reel and the other becomes the shaft of a supply reel. When the magnetic recording tape travels in the other direction, the other of the pair of reel shafts becomes the shaft of the take-up reel, and the former becomes the shaft of the supply reel. The switching between reel shafts is effected by switching the transmission of the driving force of a driving means by disposing an idler or a unidirectional clutch means with each reel shaft. With such a construction, the driving force of the driving means is not transmitted to the shaft of the supply reel so that the shaft of the supply reel slips. Thus, the shaft of the supply reel sometimes rotates at a speed faster than the traveling speed of the magnetic recording tape in the same direction as the magnetic recording tape when it travels from the shaft of the supply reel to the shaft of the take-up reel. This phenomenon results in the generation of an irregular change in the back tension at a portion of the magnetic recording tape between the supply reel shaft and the take-up reel shaft. This irregular change in the back tension in turn causes wow and flutter.

SUMMARY OF THE INVENTION

It is, therefore, the primary object of the present invention to provide a capstan drive type magnetic recording tape drive apparatus of a construction of the above-mentioned type wherein a back tension of constant magnitude is generated on the magnetic recording tape between the supply reel shaft and the capstan.

BRIEF DESCRIPTION OF THE DRAWINGS

FIGS. 1-7 illustrate a capstan drive type magnetic recording tape drive apparatus in accordance with an embodiment of the present invention wherein:

FIG. 1 is a front view of the driving seat of an automobile which is equipped with the capstan drive type magnetic recording tape drive apparatus of the present invention;

FIG. 2 is a front view of an essential part of the capstan drive type magnetic recording tape drive apparatus of FIG. 1;

FIG. 3 is a sectional view along the line III—III of FIG. 2;

FIG. 4 is an exploded perspective view of the first reel shaft shown in FIG. 3;

FIG. 5 is a front view illustrating a micro-cassette mounted on the capstan drive magnetic recording tape drive apparatus of FIG. 2 wherein the tape transporting member is arranged in a first position;

FIG. 6 is a front view illustrating the state that the tape transporting member of FIG. 5 has already moved to a second position and a swinging member has not rotate in one or the other direction by the rotation of one of the two ratchets; and FIG. 7 is a front view illustrating the state wherein the swinging member of FIG. 6 rotates in one direction by the rotation of one of the ratchets and engages with the other ratchet.

DETAILED DESCRIPTION OF THE PREFERRED EMBODIMENT

Figure 1:
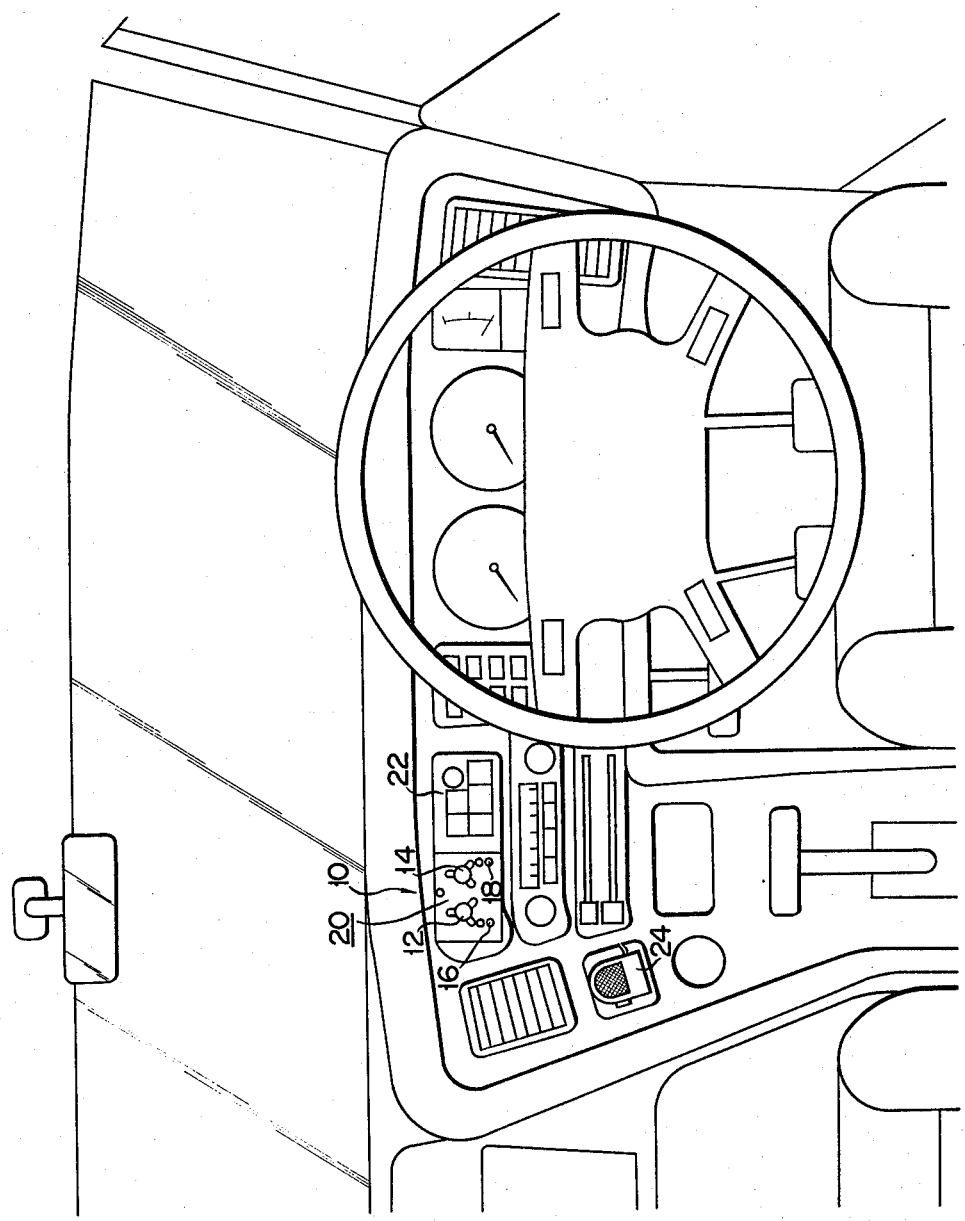

FIG. 1 shows the driving seat of an automobile which is equipped with a capstan drive type magnetic recording tape drive apparatus 10 in accordance with one embodiment of the present invention. In this embodiment, the capstan drive type magnetic recording tape drive apparatus 10 is a tape recorder. Further, in this embodiment, the capstan drive type magnetic recording tape drive apparatus 10 has a cassette mounting portion 20 from which protrude first and second reel shafts 12 and 14 and first and second capstans 16 and 18; an operating part 22 having various knobs and buttons for operating the magnetic recording tape drive apparatus 10; and a microphone 24. On the tape cassette mounting part 20 of this embodiment can be mounted a tape cassette which is usually called a micro-cassette. The various buttons and knobs of the operating part 22 are: a fast forward button, a stop/eject button, a rewind button, a playback button, a record button, and a tone/volume knob.

Figure 2:
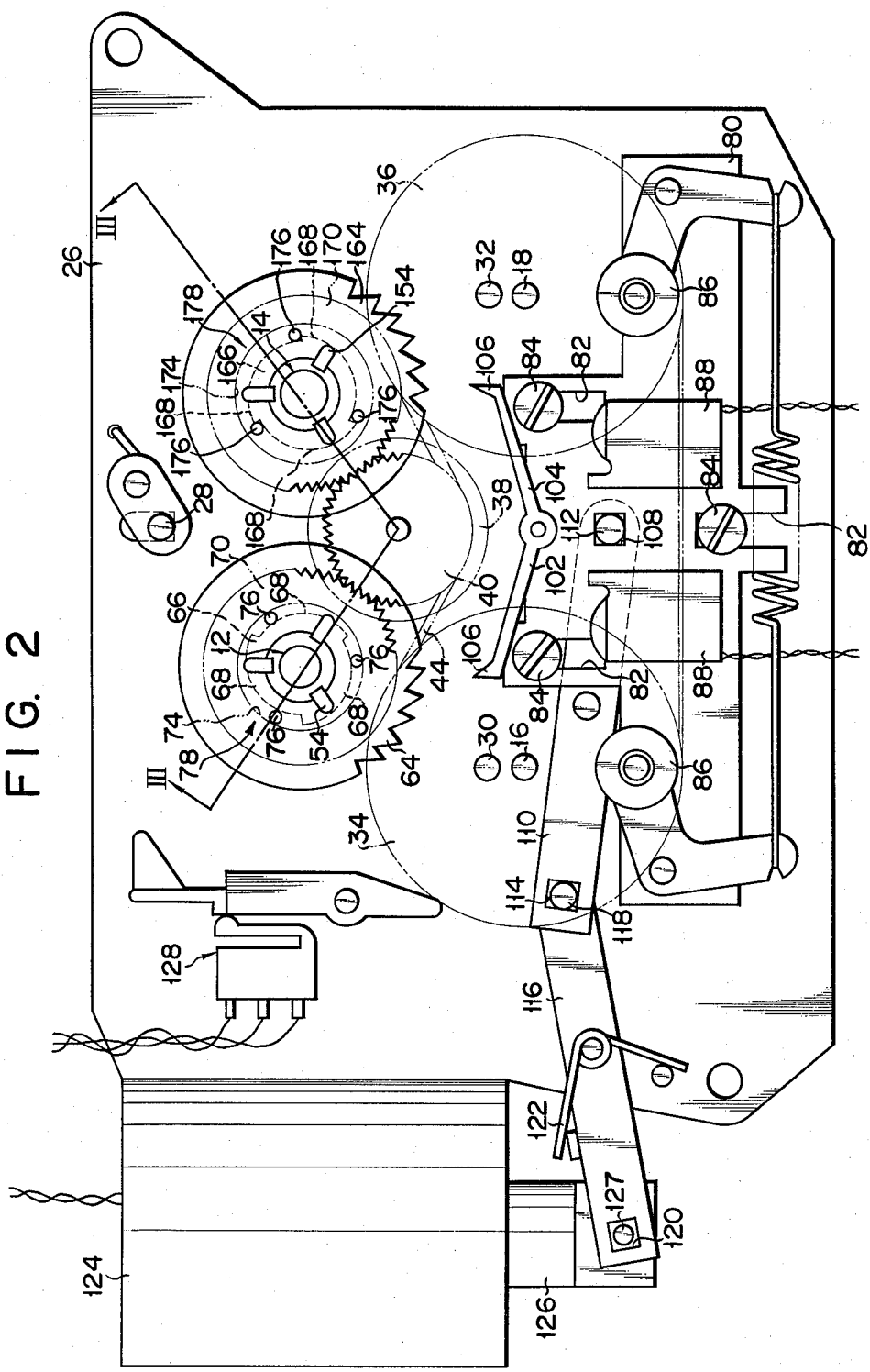
Figure 3:
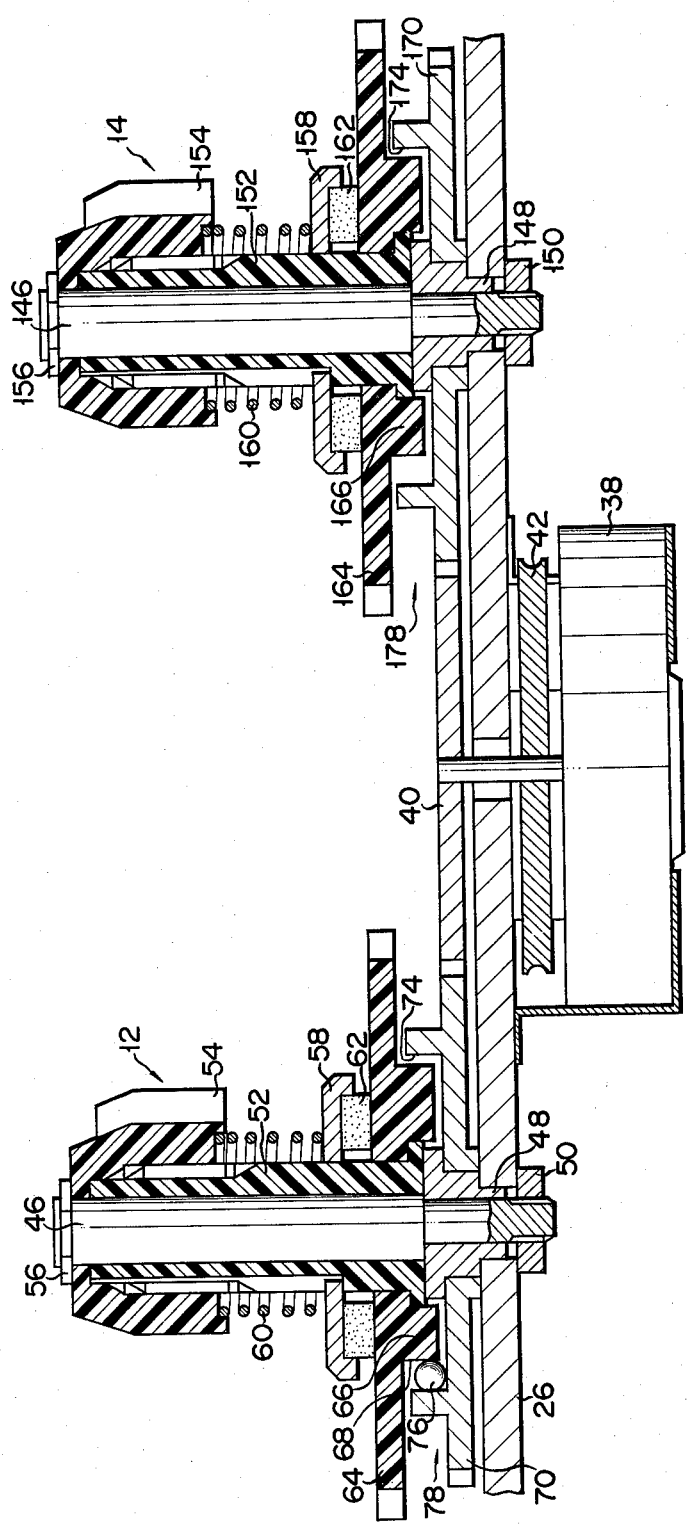

The first and second reel shafts 12 and 14 of the tape cassette mounting part 20 have a chassis 26 made of a plate material. The first and second reel shafts 12 and 14 protrude from the front surface of the chassis 26 in a manner to be vertical thereto. First, second and third cassette position setting pins 28, 30 and 32 protrude from the front surface of the chassis 26 so as to be perpendicular to it. The first, second and third cassette position setting pins 28, 30 and 32 are securely fixed to the chassis 26. As shown in FIG. 2, the first and second capstans 16 and 18 protrude from the chassis 26 so as to be perpendicular to it. The first and second capstans 16 and 18 are rotatably mounted on the chassis 26. First and second flywheels 34 and 36 having the same dimensions and shapes are, as shown in FIG. 2, disposed coaxially with the first and second capstans 16 and 18 behind the chassis 26. A drive means 38 for providing the driving force is disposed above the central portion of the first and second flywheels 34 and 36 as shown in FIG. 2. In this embodiment, the drive means 38 is a motor which is capable of rotating with the same characteristics and speed in both directions and which is electrically connected to an electric circuit (not shown) of the magnetic recording tape drive apparatus 10. The drive means 38, as shown in FIGS. 2 and 3, is fixed to the rear surface of the chassis 26. A small gear 40 and a pulley 42 are coaxially fixed to the output shaft of the drive means 38, as shown in FIGS. 2 and 3. When the fast forward button or the playback button of the operating part 22 of the magnetic recording tape drive apparatus 10 is depressed, the drive means 38 rotates the small gear 40 and the pulley 42 at the same speed in one direction, that is, the counterclockwise direction in FIG. 2. When the rewind button of the operating part 22 is depressed, the drive means 38 rotates the small gear 40 and the pulley 42 at the same speed in the other direction, that is, the clockwise direction of FIG. 2. When the stop/eject button is depressed, the drive means 38 interrupts the rotation of the two parts, since the supply of current is blocked. A drive belt 44 as shown in FIG. 2 is disposed between the small gear 40 and the first and second flywheels 34 and 36. Thus, when the drive means 38 rotates in one direction, that is, the counterclockwise direction of FIG. 2, the first and second flywheels 34 and 36 rotate in the clockwise direction of FIG. 2 at the same speed; they rotate in the counterclockwise direction of FIG. 2 when the drive means 38 rotates in the other direction, that is, the clockwise direction of FIG. 2.

Figure 4:
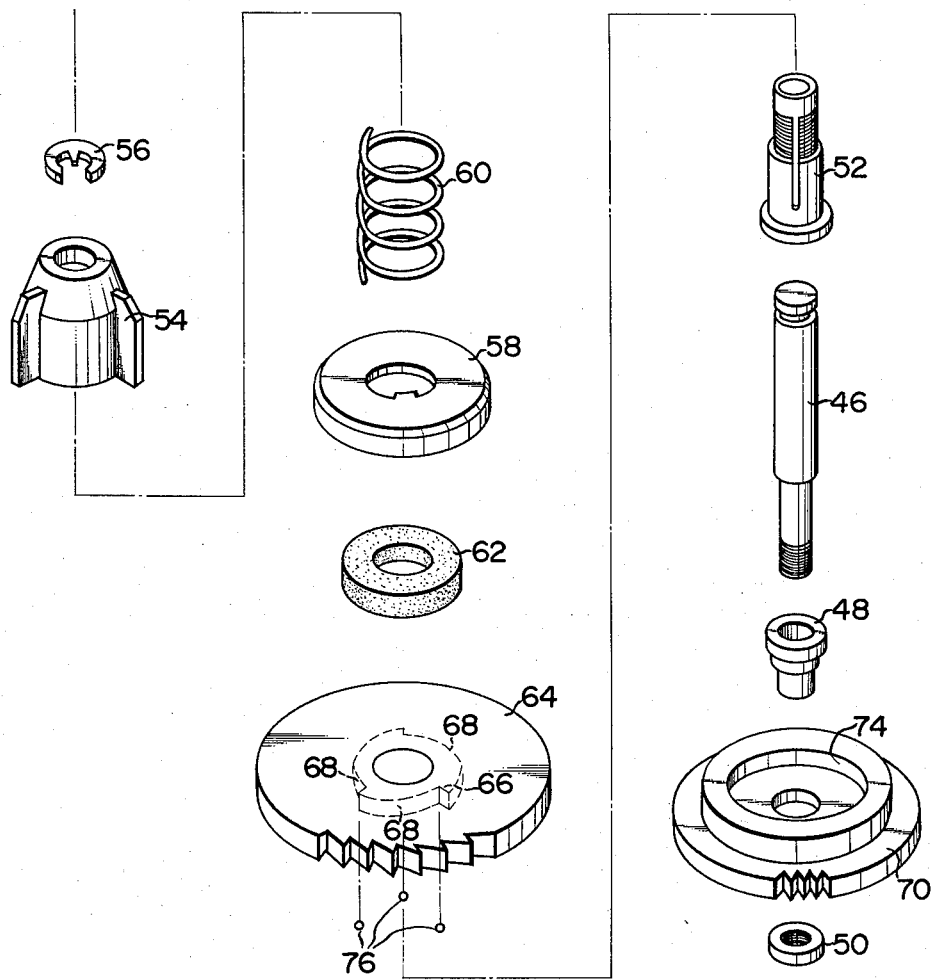

The first reel shaft 12 has a central column 46; its details are shown in FIGS. 3 and 4. An annular groove is formed on the circumferential surface at the upper end of the central column 46, as shown in FIGS. 3 and 4, and a male screw is formed at the circumferential surface at the lower end of the central column 46 as shown in FIGS. 3 and 4. The central column 46 is mounted through a collar 48 in a hole formed in the chassis 26, as shown in FIGS. 3 and 4. Under this condition, this male screw of the central column 46 protrudes from the lower surface of the chassis 26, as shown in FIG. 3. The central column 46 is fixed to the chassis 26 by the threadable engagement of the male screw with a nut 50. Inside a cylindrical part 52 is rotatably fit the central column 46, as shown in FIGS. 3 and 4. An outer flange is formed at the lower end of the cylindrical part 52, as shown in FIGS. 3 and 4. The lower end surface of the outer flange abuts the upper end surface of the collar 48, the abutting of the outer flange causes establishment of a position of the cylindrical part 52 in upper and lower direction of FIG. 3 against the chassis 26, thus the cylindrical part 52 apart from the chassis 26. The outer circumferential surface of the upper end of the cylindrical part 52, as shown in FIG. 4, male screw is formed. At the outer circumferential surface of the upper end surface of the cylindrical part 52, as shown in FIG. 4, a slit extending in the upper and lower direction is formed. At the male screw of the cylindrical part 52, as shown in FIGS. 3 and 4, a wing part 54 having a plurality of wings for engagement with a reel being rotatably mounted in the micro-cassette is screwed. At the annular groove of the central column, a snap ring 56 showed in FIGS. 3 and 4 is engaged. The snap ring 56 prevents the wing part 54 from leaving off from the central column 46. A reel base 58 with a central hole showed in FIG. 4 fits with the cylindrical part 52, as shown in FIG. 3. A key is formed in the opening of the reel base 58, as shown in FIG. 4. This key engages with the slit in the cylindrical part 52, as shown in FIG. 3. Thus, the reel base 58 rotates in the same direction together with the cylindrical part 52. In this embodiment, the reel shaft 12 comprises the central column 46, the cylindrical part 52, a wing part 54, the reel base 58, and a compression spring 60.

The compression spring 60 is interposed between the lower end surface of the wing part 54 and the upper end surface of the reel base 58, as shown in FIGS. 3 and 4. The compression spring 60 biases the reel base 58 downwardly in FIG. 3. A first connecting means 62 is secured to the lower end surface of the reel base 58, as shown in FIGS. 3 and 4. In this embodiment, the first connecting means 62 comprises an annular shaped felt and is coaxial with the central column 46.

A ratchet wheel 64 is coaxial with and rotatably covers the outer circumferential surface of the lower end of the cylindrical part 52, as shown in FIGS. 3 and 4. The ratchet wheel 64 is a first slipping member which is rotatably mounted on the first reel shaft 12. The ratchet wheel 64 in FIG. 3 is vertically set with respect to the chassis 26 by abutting the lower end surface of the ratchet wheel 64 against the upper end surface of the outer flange mentioned above, and the ratchet wheel 64 is separated from the chassis 26. The first connecting means 62 abuts against the upper end surface of the ratchet wheel 64 as shown in FIG. 3. Each tooth of the ratchet wheel 64 is substantially in the form of right triangle as shown in FIGS. 2 and 4. The inclined surface of the tooth is located at the front side when the ratchet wheel 64 rotates in the clockwise direction.

A first engaging member 66 is coaxially fixed to the lower end surface of the ratchet wheel 64 as shown in FIGS. 3 and 4. The circumferential surface of the first engaging member 66 comprises a plurality of engaging surfaces 68. Each engaging surface 68 is formed by a part of an outwardly spreading spiral shape as the ratchet wheel turns in the clockwise direction.

A first engaged member 70 coaxially rotatably covers the outer circumferential surface of the collar part 48 protruding from the upper surface of the chassis 26, as shown in FIG. 3. A number of teeth are formed at the circumferential surface of the first engaged member 70, as shown in FIGS. 2 and 4. The first engaged member 70, as shown in FIGS. 2 and 3, engages with the small gear 40 of the drive means 38.

An annular projection 72 is formed coaxial with the collar 48 at the upper surface of the first engaged member 70, as shown in FIG. 4. The inner circumferential surface of the annular projection 72 faces the engaging surface of the first engaging member 66, as shown in FIG. 3. The inner circumferential surface of the annular projection will hereinafter be referred to as the engaged surface 74.

Balls 76 are disposed between each of the plurality of engaging surfaces 68 of the first engaging member 66 and the engaged surface 74 of the first engaged member 70, as shown in FIGS. 2 to 4. In this embodiment, the balls 76 are steel balls. The diameter of each ball 76 is smaller than the distance between the minimum diameter portion of the engaging surfaces 68 and the engaged surface 74 and is greater than the distance between the maximum diameter portion of the engaging surfaces 68 and the engaged surface 74. Thus, the balls 76 slip between the minimum diameter portion of the engaging surfaces 68 and the engaged surface 74 and are in contact with the engaging surfaces 68 and the engaged surface 74 when they are located between an area positioned between the maximum diameter portion and the minimum diameter portion of the engaging surfaces 68, and the engaged surface 74. Thus, the balls 76 are clamped between the engaging surfaces 68 and the engaged surface 74. In this embodiment, a first driving force transmitting means 78 comprises the first engaging member 66, the first engaged member 70, and the balls 76. Further, in this embodiment, a first reel shaft mechanism comprises the first reel shaft 12, the first connecting means 62, the ratchet wheel 64, and the first driving force transmitting means 78.

A second reel shaft mechanism has, as shown in FIG. 3, the second reel shaft 14 of the same construction as the first reel shaft 12, and a second connecting means 162. The second reel shaft mechanism has a ratchet wheel 164 whose teeth are oriented in the opposite direction from those of the ratchet wheel 64 of the first reel shaft mechanism. The inclined surfaces of the right triangle shaped teeth of the ratchet wheel 164 are located at the front side when the ratchet wheel 164 rotates in the counterclockwise direction. The ratchet wheel 164 is a second slipping member which is rotatably disposed on the second reel shaft 14. The second reel shaft mechanism has a second driving force transmitting means 178, as shown in FIG. 3. The second driving force transmitting means 178, as shown in FIG. 2, is of the same construction as the first driving force transmitting means 78 except that each engaging surface 168 of the second engaging member 166 is formed by a part of an outwardly spreading spiral shape as the ratchet turns in the counterclockwise direction. The arrangement of the second reel shaft mechanism combining the second reel shaft 14, the second connecting means 162, the ratchet wheel 164, and a second unidirectional clutch means 178 is the same as that of the first reel shaft mechanism shown in FIG. 3 combining the first connecting means 62, the ratchet wheel 64 and the first unidirectional clutch means 78. Thus, the plurality of constituent members of the second reel shaft mechanism, except for those mentioned above, will be denoted by reference numerals obtained by adding 100 to each of the reference numerals of the respective constituent members of the first reel shaft mechanism. The detailed description of these members will thus be omitted.

A second engaged member 170 of the second reel shaft mechanism engages with the small gear 40 of the drive means 38, as shown in FIGS. 2 and 3.

The operation of the first reel shaft mechanism and the second reel shaft mechanism of the above-mentioned constructions will be described.

Figure 5:
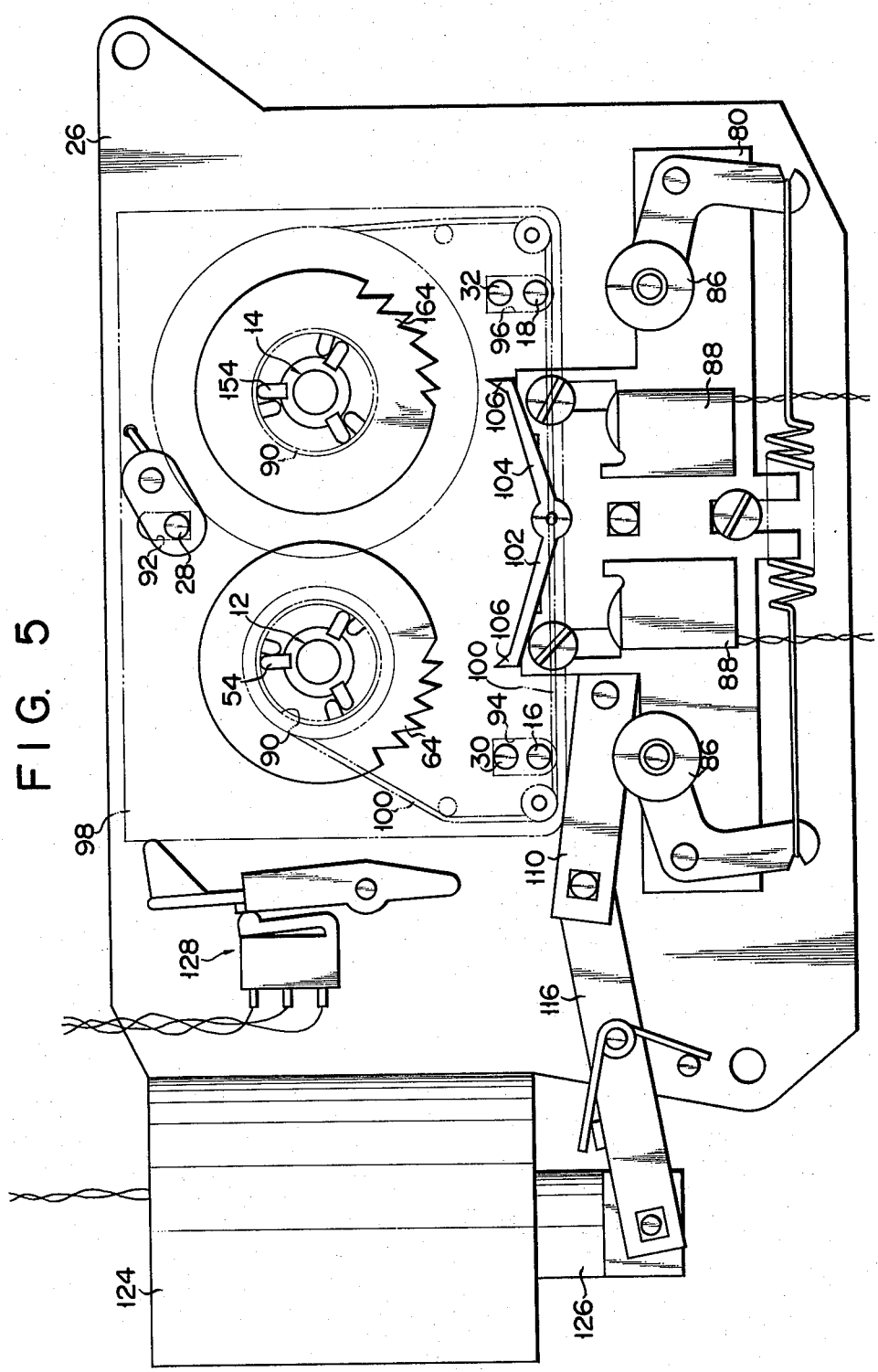

It will be assumed that the small gear 40 and the pulley 42 of the drive means 38 rotate in one direction in FIG. 2, that is, the counterclockwise direction in the case of this embodiment. In this instance, the first and second capstans 16 and 18 rotate at the same speed in the clockwise direction. The first engaged member 70 of the first reel shaft mechanism and the second engaged member 170 of the second reel shaft mechanism rotate at the same speed in the clockwise direction. In the first reel shaft mechanism, the balls 76 the transferred from the minimum diameter portion toward the maximum diameter portion of the engaging surfaces 68 of the first engaging member 66 by contact with the engaged surface 74 of the first engaged member 70. The balls 76 are clamped between the engaged surface 74 of the first engaged member 70 and the engaging surfaces 68 of the first engaging member 66. Thus, the first engaged member 70 is fixed to the first engaging member 66 so that the first engaging member 66 rotates with the first engaged member 70 at the same speed and in the same direction. In the second reel shaft mechanism, the balls 176 are transferred toward the minimum diameter portion of the engaging surfaces 168 of the second engaging member 166 by contacting the engaged surface 174 of the second engaged member 170. Then the balls 176 slip between the engaged surface 174 of the second engaged member 170 and the minimum diameter portion of the engaging surfaces 168 of the second engaging member 166. The second engaged member 170 is not fixed to the second engaging member 166 so that the second engaging member 166 does not rotate with the second engaged member 170 at the same speed and in the same direction. In this instance, as shown in FIG. 5, if the wing part 54 of the first reel shaft 12, the wing part 154 of the second reel shaft 14, the first to third cassette position setting pins 28, 30 and 32, and the first capstan 16 and the second capstan 18 are inserted in a pair of reels 90 of a micro-cassette tape 98 and in respective first to third cassette position setting pin insertion holes 92, 94 and 96, the first reel shaft functions as the shaft of the take-up reel and the second reel shaft functions as the shaft of the supply reel. The first connecting means 62 connects the reel base 58 of the first reel shaft 12 with the first engaging member 66 of the first unidirectional clutch 78 in such a manner that they rotate together by the frictional force between the first connecting means and the upper surface of the ratchet wheel 64 to which is fixed the first engaging member 66 of the first unidirectional clutch means 78. Therefore, the driving force of the drive means 38 is transmitted from the first engaging member 66 of the first driving force transmitting means 78 to the reel base 58 of the first reel shaft 12. The value of the rotational torque produced on the first reel shaft 12 changes in proportion to the rotational torque produced at the engaging member 66 of the first unidirectional means 78 as the diameter of the coil of magnetic recording tape 100 wound on the reel 90 mounted to the wing part 54 of the first reel shaft 12 changes. The rotation of the first reel shaft 12 relative to the first engaging member 66 is controlled according to the difference between the rotational torque produced on the first reel shaft 12 and the rotational torque produced at the first engaging member 66 of the first unidirectional clutch means 78.

Now it is assumed that the small gear 40 and the pulley 42 rotate in the other direction of FIG. 2, that is, in the clockwise direction of the embodiment. In this instance, the first and second capstans 16 and 18 rotate at the same speed in the counterclockwise direction. Then, the first engaged member 70 of the first reel shaft mechanism and the second engaged member 170 of the second reel shaft mechanism rotate at the same speed in the counterclockwise direction. The second reel shaft 14 of the second reel shaft mechanism functions as a take-up reel shaft, as was the case with the first reel shaft 12 of the first reel shaft mechanism which functioned as a take-up reel shaft, as previously mentioned. The first reel shaft 12 of the first reel shaft mechanism functions as a supply reel shaft, as was the case with the second reel shaft 14 of the second reel shaft mechanism which also functioned as a supply reel shaft. The second connecting means 162 connects the reel base 158 of the second reel shaft 14 with the second engaging member 166 of the second driving force transmitting means 178 in such a manner that they rotate together by the frictional force between the second connecting means and the upper surface of the ratchet wheel 164 to which is fixed the second engaging member 166 of the second driving force transmitting means 178. Thus, the driving force of the drive means 38 is transmitted from the second engaging member 166 of the second driving force transmitting means 178 to the reel base 158 of the second reel shaft 14. The rotational torque produced on the second reel shaft 14 changes in proportion to the rotational torque produced at the second engaging member 166 of the second driving force transmitting means 178 as the diameter of the coil of the magnetic recording tape 100 wound on the reel 90 mounted to the wing part 154 of the second reel shaft 14 changes. The rotation of the second reel shaft 14 with respect to the second engaging member 166 is controlled according to the difference between the rotational torque produced on the second reel shaft 14 and the rotational torque produced at the second engaging member 166 of the second driving force transmitting means 178.

A movable member 80 of a plate material is arranged on the front surface of the chassis 26 and parallel thereto, as shown in FIG. 2. A plurality of vertically extending guide holes 82 are formed in the movable member 80, as shown in FIG. 2. Guide pins 84 on the front surface of the chassis 26 are inserted in each of a plurality of guide holes 82, as shown in FIG. 2. Thus, the movable member 80 is vertically displaceable parallel to the front surface of the chassis 26. The position of the movable member 80 when the guide pins 84 are located at the upper ends of the guide holes 82 is defined as the first position as shown in FIG. 2. When the guide pins 84 are located at the lower ends of the guide holes 82, the movable member 80 draws closer to the ratchet wheel 64 which is the first slipping member and the ratchet wheel 164 which is the second slipping member than when located at the first position. The location of the movable member 80 in this instance is defined as the second position.

A pair of pinch rollers 86 and a pair of magnetic heads 88 are disposed on the front surface of the movable member 80, as shown in FIG. 2. When the movable member 80 is located at the first position, as shown in FIG. 2, the pinch rollers 86 are disposed immediately below but separate from the first and second capstans 16 and 18. The pair of magnetic heads 88 are interposed between the pair of pinch rollers 86. When the movable member 80 is located at the first position as shown in FIG. 2, the pair of magnetic heads 88 are located, as shown in FIG. 5, immediately below a window for inserting the magnetic heads and the pinch rollers, which is formed at the front wall of the housing of the micro-cassette 98. The wing part 54 of the first reel shaft 12, the wing part 154 of the second reel shaft 14, the first cassette position setting pin 28, the second cassette position setting pin 30, the third cassette position setting pin 32, the first capstan 16 and the second capstan 18 are inserted in the pair of reels 90 and the first to third cassette position setting pin insertion holes 92, 94 and 96. The pair of magnetic heads 88 are separated from the magnetic recording tape 100 which is wound on the pair of reels 90 of the micro-cassette 98 and which is exposed at the window for inserting the magnetic heads and the pinch rollers. In this embodiment, each of the magnetic heads 88 is a combination of an erasing head and a recording/reproducing head and is electrically connected to an electric circuit (not shown) of the magnetic recording tape drive apparatus 10. When the playback button of the operating part 22 of the magnetic recording tape drive apparatus 10 is depressed, one of the magnetic heads 88 functions as a reproducing magnetic head and reproduces sound from a track of the magnetic recording tape 100 mounted in the micro-cassette 98. When the recording button is depressed, this head functions as a recording magnetic head and records sound on the above track through the microphone 24. When the playback button is depressed and the drive means 38 rotates in the above-mentioned other direction, the other magnetic head 88 functions as a reproducing magnetic head and reproduces sound from a different track of the above-mentioned magnetic recording tape 100 mounted in the micro-cassette 98. When the recording button is depressed and the drive means 38 rotates in the above-mentioned other direction, this magnetic head functions as a recording magnetic head and records sound on the above-mentioned different track through the microphone 24.

A swinging member 102 is disposed near the center of the upper edge of the movable member 80 as shown in FIG. 2. The swinging member 102, as shown in FIG. 2, has a lever 104 swingably mounted to the movable member 80 at the center of the ends of the lever 104. The swinging member 102 also has a pair of engaging parts 106 formed at the ends of the lever 104 and protruding toward the ratchet wheel 64 of the first reel shaft mechanism and the ratchet wheel 164 of the second reel shaft mechanism. In this embodiment, the lever 104 and the engaging parts 106 of the swinging member 102 are formed by a one piece-molding process using an elastic synthetic resin. Therefore, the lever 104 of the swinging member 102 constitutes a shock absorbing means for absorbing the shock exerted on the pair of engaging parts 106. When the movable member 80 is located at the first position as shown in FIG. 2, the pair of engaging parts 106 of the swinging member 102 are separated from the ratchet wheel 64 of the first reel shaft mechanism and from the ratchet wheel 164 of the second reel shaft mechanism.

Figure 6:
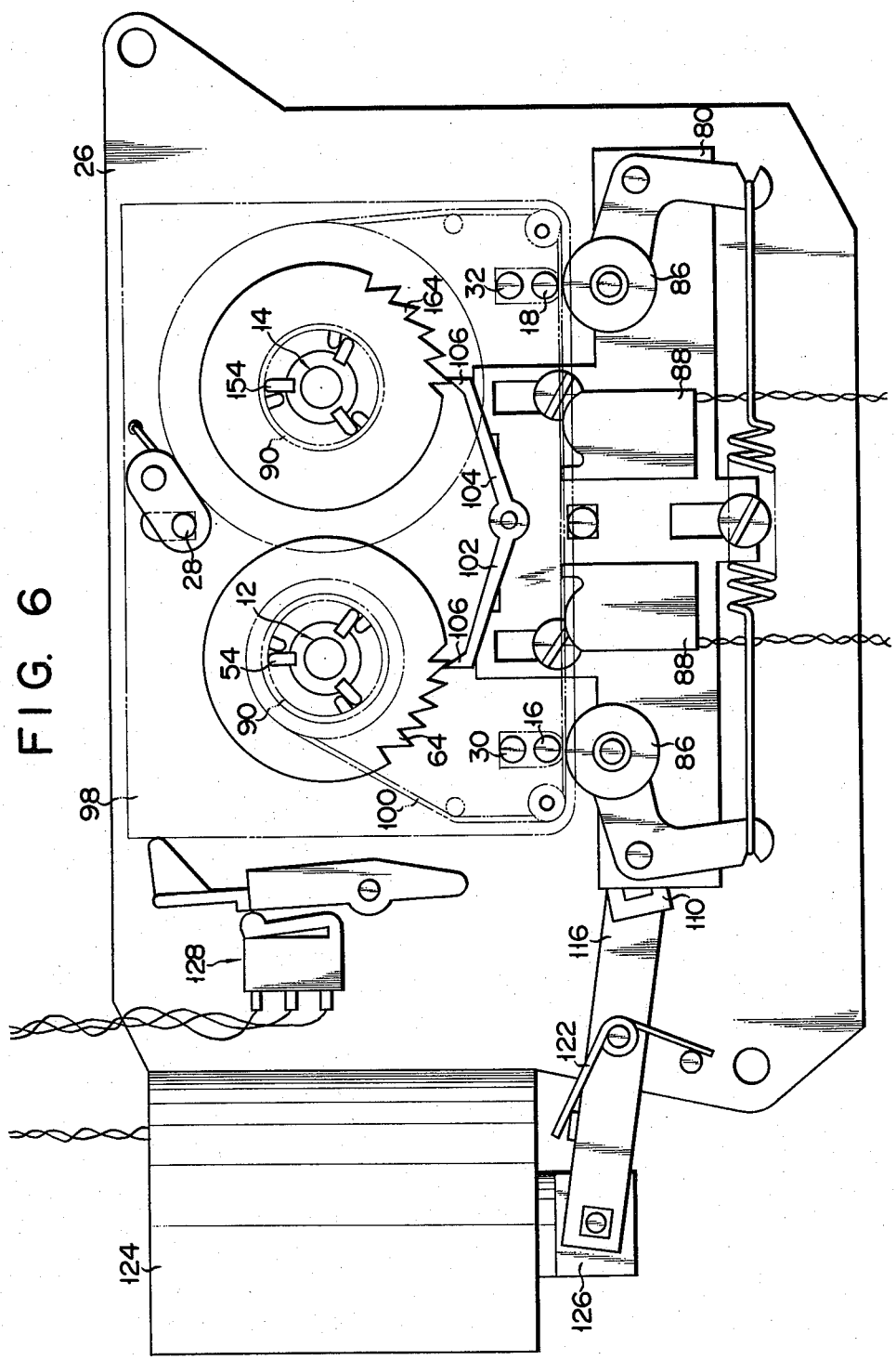

An opening 108 is formed at the center of the movable member 80, as shown in FIG. 2. One end of a first arm 110 crosses the opening 108, this arm being arranged parallel to the upper surface of the chassis 26 and extending in the transverse direction of FIG. 2. A pin 112 is fixed to this end of the first arm 110, as shown in FIG. 2, and this pin 112 shown in FIG. 2 is inserted in the opening 108. The central portion of the first arm 110 is rotatably fixed to the upper surface of the chassis 26. The first arm 110 is rotatable in a plane parallel to the upper surface of the chassis 26. An opening 114 is formed at the other end of the first arm 110, as shown in FIG. 2. One end of a second arm 116 crosses the opening 114, this arm being arranged parallel to the upper surface of the chassis 26 and extending in the transverse direction of FIG. 2. A pin 118 is fixed to this one end of the second arm 116, as shown in FIG. 2, and the pin 118 is inserted in the opening 114. The central portion of the second arm 116 is rotatably fixed to the upper surface of the chassis 26. The second arm 116 is rotatable in a plane parallel to the upper surface of the chassis 26. An opening 120 is formed at the other end of the second arm 116, as shown in FIG. 2. The second arm 116 further has a biasing member 122 the biasing member 122 is constituted by a torsion coil spring in this embodiment. The biasing member 122 constantly biases the second arm 116 in the counterclockwise direction. A plunger 124 is fixed to the left edge of the chassis 26, as shown in FIG. 2. The plunger 124 has a downwardly projecting operating rod 126, as shown in FIG. 2, and the protruding end of the operating rod 126 crosses the opening 120 formed in the other end of the second arm 116. A pin 127 is fixed to the protruding end of the operating rod 126 and it extends through the opening 120 formed in the other end of the second arm 116. The plunger 124 is electrically connected to the electric circuit (not shown) of the magnetic recording tape drive apparatus 10. The plunger 124 is supplied with electric current only when the playback button of the operating part 22 of the magnetic recording tape drive apparatus 10 is depressed. When current is applied to the plunger 124, the operating rod 126 of the plunger 124 is moved upwardly in FIG. 6 by a solenoid (not shown) housed in the housing of the plunger 124. At this time the movable member 80 is moved from the first position showed in FIG. 2 to the second position showed in FIG. 5 by the action of the second arm 116 and the first arm 110. When the wing part 54 of the first reel shaft 12, the wing part 154 of the second reel shaft 14, the first cassette position setting pin 28, the second cassette position setting pin 30, the third cassette position setting pin 32, the first capstan 16 and the second capstan 18 are inserted, or engaged in the pair of reels 90 of the micro-cassette 98, and in the respective first to third cassette position setting pin insertion holes 92, 94 and 96, as shown in FIG. 6, the pair of magnetic heads 88 and the pair of pinch rollers 86 of the movable member 80 which has been moved to the second position are inserted in the window for inserting the magnetic heads and the pinch rollers of the micro-cassette tape 98 and contact with the magnetic recording tape 100 exposed in the window. In particular, the pair of pinch rollers 86 clamp the magnetic recording tape 100 in cooperation with the first and second capstans 16 and 18 as shown in FIG. 6. The pair of engaging parts 106 of the swinging member 102 of the movable member 80 are so arranged that they are able to cross with the rotating locus of the teeth of either the ratchet wheel 64 of the first reel shaft mechanism or the ratchet wheel 164 of the second reel shaft mechanism as shown in FIG. 6.

When the supply of current to the plunger 124 is interrupted, the operating rod 126 is moved downwardly in FIG. 2 by the biasing force of the biasing member 122 of the second arm 116. In this instance, the movable member 80 is returned to the first position shown in FIGS. 2 and 5 by the action of the second arm 116 and the first arm 110.

A switch 128 for preventing accidental erasure of information recorded in the magnetic recording tape is disposed at the front surface of the chassis 26 as shown in FIG. 2. The switch 128 is contacted with one of removable lugs for preventing accidental erasure of information recorded in the magnetic recording tape (not shown) which are arranged on the right and left walls of the housing of the micro-cassette tape 98 in which the pair of reels 90 engage with the wing parts 54 and 154 of the first and second reel shafts 12 and 14 as shown in FIG. 5. The switch 128 is electrically connected to the electric circuit (not shown) of the magnetic recording tape drive apparatus 10. The switch 128 interrupts the supply of current to the plunger 124 only when the removable lugs of the micro-cassette 98 are removed and the recording button of the operating part 22 is depressed.

The magnetic recording tape drive apparatus 10 of one embodiment of the present invention has an automatic reversing device (not shown). The automatic reversing device is of the known type and is electrically connected to the electric circuit (not shown) of the magnetic recording tape drive apparatus 10. The above-mentioned automatic reversing device is of the known construction. When the reproducing button of the operating part 22 of the magnetic recording tape drive apparatus 10 is depressed, the magnetic recording tape 100 of the micro-cassette 98 is traveled from the reel 90 engaging with the wing part 154 of the second reel shaft 14 to the reel 90 engaging with the wing part 54 of the first reel shaft 12. When the tape is completely wound on the latter reel 90, the small gear 40 and the pulley 42 of the drive means 38 are reversed in their direction of rotation by work of the reversing device. When the magnetic recording tape 100 of the micro-cassette 98 is completely wound on the reel 90 engaging with the wing part 154 of the second reel shaft 14, the direction of rotation of the small gear 40 and the pulley 42 of the drive means 38 is reversed by work of the reversing device, so that the magnetic recording tape 100 is traveled from the reel 90 mounted on the wing part 154 of the second reel shaft 14 to the reel 90 mounted on the wing part 54 of the first reel shaft 12.

The operation of the capstan drive type magnetic recording tape drive apparatus of the above-mentioned construction in accordance with one embodiment of the present invention will now be described.

It is assumed that the pair of reels 90 of the micro-cassette 98 having the removable lugs engage with the wing part 54 of the first reel shaft 12 and the wing part 154 of the second reel shaft 14 as shown in FIG. 5. The sound is already recorded on the magnetic recording tape 100 of the above-mentioned micro-cassette tape 98.

Figure 7:
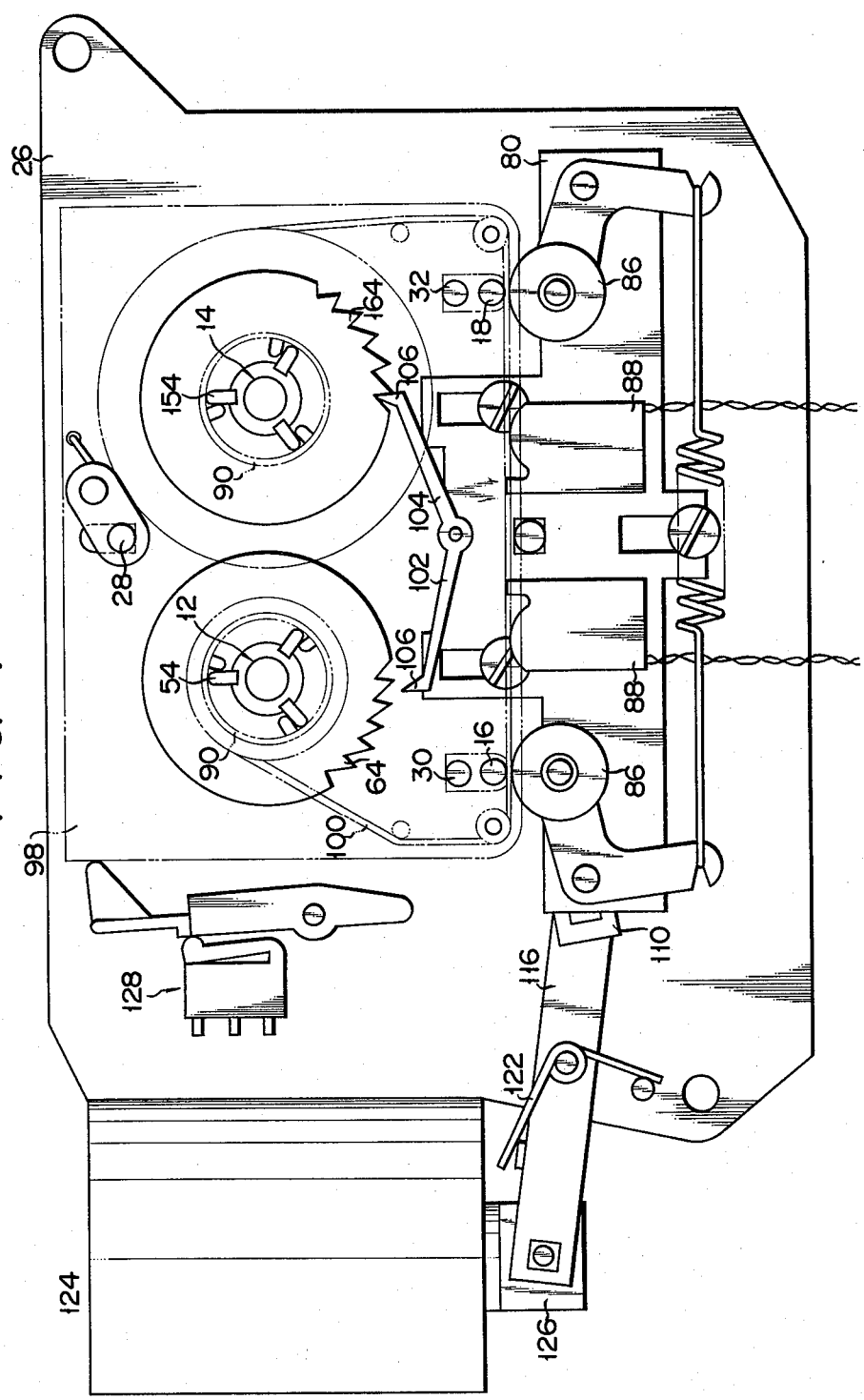

When the playback button of the operating part 22 of the magnetic recording tape drive apparatus 10 is depressed, the movable member 80 is moved to the second position as shown in FIG. 6, by the action of the plunger 124, the second arm 116 and the first arm 110. In this instance, the pair of magnetic heads 88 are contacted with the magnetic recording tape 100, and the pair of pinch rollers 86 clamp the magnetic recording tape 100 in cooperation with the first capstan 16 and the second capstan 18. Then the small gear 40 and the pulley 42 of the drive means 38 rotate in the counterclockwise direction of FIG. 2. Then the first engaged member 70 of the first reel shaft mechanism and the second engaged member 170 of the second reel shaft mechanism rotate in the clockwise direction of FIG. 2 at a constant speed. The first capstan 16 and the second capstan 18 rotate in the clockwise direction of FIG. 2 at a constant speed. Therefore, the first reel shaft 12 of the first reel shaft mechanism functions as a take-up reel shaft, and the second reel shaft 14 of the second reel shaft mechanism functions as a supply reel shaft, as previously described. The magnetic recording tape 100 travels at a constant speed from the reel 90 engaging with the wing part 154 of the second reel shaft 14 to the reel 90 engaging with the wing part 54 of the first reel shaft 12 by the action of the first capstan 16 and the second capstan 18. One of the engaging parts 106 of the swinging member 102 crosses the locus of the teeth of the ratchet wheel 64 of the first reel shaft mechanism and the other of the engaging parts 106 crosses the locus of the teeth of the ratchet wheel 164 of the second reel shaft mechanism. Thus, one of the engaging parts 106 of the swinging member 102 collides with one of the teeth of the ratchet wheel 64 of the first reel shaft mechanism rotating in the clockwise direction. Thus, the swinging member 102 rotates in the counterclockwise direction of FIG. 7. The other of the engaging parts 106 of the swinging member 102 rotated in the counterclockwise direction collides with one of the valley portions of teeth of the ratchet wheel 164 of the second reel shaft mechanism. Since the lever 104 of the swinging member 102 is made of an elastic synthetic resin for constituting a shock absorbing means, the shock produced when the other engaging part 106 coolides with the ratchet wheel 164 is absorbed by the lever 104. Therefore, such a shock does not cause a rotation of the swinging member 102 in the clockwise direction of FIG. 7, so that the other engaging part 106 of the swinging member 102 firmly engages the teeth of the ratchet wheel 164 of the second reel shaft mechanism. This fact causes preventing rotation of the ratchet wheel 164 in the clockwise direction and thus rotation of the second driving force transmitting means 178 in the clockwise direction of FIG. 7. One of the engaging parts 106 of the swinging member 102 is separated from the locus of the rotating teeth of the ratchet wheel 64 of the first reel shaft mechanism as shown in FIG. 7, so that the rotation of the ratchet wheel 64 and therefore the rotation of the first driving force transmitting means 78 in the clockwise direction of FIG. 7 is not prohibited. The second connecting means 162 of the second reel shaft mechanism functions to control and make constant the rotation of the second reel shaft 14 relative to the ratchet wheel 164 whose rotation is prohibited. Thus, a back tension of constant strength is produced on the magnetic recording tape 100 between the part at the second capstan 18 and the part at the reel 90 engaging with the wing part 154 of the second reel shaft 14. one of the two magnetic heads functions as a reproducing magnetic head, and reproduces sound from a certain track of the magnetic recording tape 100. When the recording button is depressed after the playback button is depressed, this magnetic head functions as a recording magnetic head. Thus, it records sound through the microphone on this certain track of the magnetic recording tape 100.

When the magnetic recording tape 100 wound on the reel 90 engaging with the wing part 154 of the second reel shaft 14 is completely wound on the reel 90 engaging with the wing part 54 of the first reel shaft 12, after traveling at a constant speed toward the reel 90 engaging with the wing part 54 of the first reel shaft 12, the above-mentioned automatic reversing device (not shown) operates to reverse the direction of the rotation of the small gear 40 and the pulley 42 of the drive means 38. Thus, the small gear 40 and the pulley 42 rotate in the clockwise direction of FIG. 7. Then, the first engaged member 70 of the first reel shaft mechanism and the second engaged member 170 of the second reel shaft mechanism rotate in the counterclockwise direction of FIG. 2 at a constant speed. Further, the first capstan 16 and the second capstan 18 rotate in the counterclockwise direction of FIG. 2 at a constant speed. Therefore, the second reel shaft 14 of the second reel shaft mechanism functions as the shaft of the take-up reel, and the first reel shaft 12 of the first reel shaft mechanism functions as the shaft of the supply reel, as previously described. By the action of the first and second reel shafts 12 and 14, the magnetic recording tape 100 travels at a constant speed from the reel 90 engaging with the wing part 54 of the first reel shaft 12 to the reel 90 engaging with the wing part 154 of the second reel shaft 14. The other engaging part 106 of the swinging member 102, that is, the one which engages with the ratchet wheel 164 of the second reel shaft mechanism collides with one of the teeth of the ratchet wheel 164, rotating in the counterclockwise direction of FIG. 7, of the second reel shaft mechanism functioning as the supply reel shaft. The swinging member 102 rotates in the clockwise direction of FIG. 7. One of the engaging parts 106 of the swinging member 102 rotated in the clockwise direction collides with one of the valley portions of the teeth the ratchet wheel 64 of the first reel shaft mechanism. Since the lever 104 of the swinging member 102 constitutes a shock absorbing means of an elastic synthetic resin, the shock produced when one of the engaging parts 106 collides with the ratchet wheel 64 is absorbed by the lever 104. Therefore, since the swinging member 102 does not rotate in the counterclockwise direction by the above-mentioned shock, one of the engaging parts 106 of the swinging member 102 engages firmly with the ratchet wheel 64 of the first reel shaft mechanism so as to prevent the rotation of the ratchet wheel 64, and thus the rotation of the first driving force transmitting means 78 in the counterclockwise direction. The other engaging part 106 of the swinging member 102 is separated from the locus of the teeth of the ratchet wheel 164 of the second reel shaft mechanism, so that it does not prevent rotation of the ratchet wheel 164, or of the second driving force transmitting means 178 in the counterclockwise direction. The rotation of the first reel shaft 12 relative to the ratchet wheel 64 whose rotation is prohibited is controlled to be constant by the action of the first connecting means 62 of the first reel shaft mechanism. Thus, a back tension of constant strength is produced on the magnetic recording tape 100 between the first capstan 16 and the reel 90 engaging with the wing part 54 of the first reel shaft 12. Under this condition, one of the magnetic heads 88 does not function as has been described hereinbefore, and the other magnetic head 88 functions as the reproducing magnetic head to reproduce sound from a track of the magnetic recording tape 100 which is different from the above-mentioned certain track. If the recording button is depressed after the playback button is depressed, the other magnetic head 88 functions as the recording magnetic head to record the sound through the microphone on this track of the magnetic recording tape 100.

When the magnetic recording tape 100 is completely wound from the reel 90 engaging with the wing part 54 of the first reel shaft 12 to the reel 90 engaging with the wing part 154 of the second reel shaft 14, after traveling thereto at a constant speed, the above-mentioned automatic reversing device (not shown) operates to reverse the direction of the rotation of the small gear 40 and the pulley 42 of the drive means 38. Thus, the small gear 40 and the pulley 42 rotate in the counterclockwise direction of FIG. 7. Further, the first reel shaft 12 functions as the shaft of the take-up reel, and the second reel shaft functions as the shaft of the supply reel, as has been described. One of the two magnetic heads 88 functions as a reproducing magnetic head, as has been described. It functions as a recording magnetic head, as has been described, when the recording button is depressed as well as when the playback button is depressed.

When the fast forward button of the operating part 22 of the magnetic recording tape drive device 10 is depressed, the supply of current to the plunger 124 is blocked, so that the movable member 80 is moved from the second position shown in FIG. 7 to the first position shown in FIG. 5 by the biasing force of the biasing member 122 of the second arm 116. Then the small gear 40 and the pulley 42 of the drive means 38 rotate in the counterclockwise direction of FIG. 5. The first engaged member 70 of the first reel shaft mechanism and the second engaged member 170 of the second reel shaft mechanism rotate in the clockwise direction of FIG. 2 at a constant speed. Thus, the first capstan 16 and the second capstan 18 rotate in the clockwise direction of FIG. 2 at a constant speed. As has been described, the first reel shaft 12 of the first reel shaft mechanism functions as the shaft of the take-up reel, and the second reel shaft 14 of the second reel shaft mechanism functions as the shaft of the supply reel. The magnetic recording tape 100 travels from the reel 90 engaging with the wing part 154 of the second reel shaft 14 to the reel 90 engaging with the wing part 154 of the first reel shaft by the action of the first reel shaft 12 and the second reel shaft 14.

When the rewind button of the operating part 22 of the magnetic recording tape drive apparatus 10 is depressed, the supply of current to the plunger 124 is blocked. Thus, the movable member 80 is arranged in the first position shown in FIG. 5. The small gear 40 and the pulley 42 rotate in the clockwise direction of FIG. 5. Thus, the second reel shaft 14 of the second reel shaft mechanism functions as the shaft of the take-up reel, and the first reel shaft 12 of the first reel shaft mechanism functions as the shaft of the supply reel, as has been described. The magnetic recording tape 100 travels from the reel 90 engaging with the wing part 54 of the first reel shaft 12 to the reel 90 engaging with the wing part 154 of the second reel shaft 14 by the action of the first reel shaft 12 and the second reel shaft 14.

Since the supply of current to the drive means 38 is blocked when the stop/eject button of the operating part 22 is depressed, the second reel shaft 14, the first reel shaft 12, the first capstan 16 and the second capstan 18 cease to rotate, and the travel of the magnetic recording tape 100 of the micro-cassette 98 stops.

Thus, the capstan drive type magnetic recording tape drive apparatus of the present invention is of the construction comprising a chassis; a first reel shaft rotatably mounted on said chassis for engagement with one of a pair of reels on which is mounted a magnetic recording tape, so as to rotate with said one of said pair of reels; a second reel shaft rotatably mounted on said chassis for engagement with the other of said pair of reels on which is mounted said magnetic recording tape, so as to rotate with said other of said pair of reels; a first slipping member rotatably mounted on said first reel shaft; a second slipping member rotatably mounted on said second reel shaft; a driving force transmitting means coupled to a drive means for selectively transmitting a driving force provided by said drive means to either said first slipping member or said second slipping member; a swinging member swingably mounted to said chassis for prohibiting rotation of said first slipping member by engaging with said first slipping member when said magnetic recording tape is traveling in one direction and for prohibiting rotation of said second slipping member by engaging with said second slipping member when said magnetic recording tape is traveling in the other direction; a first connecting means interposed between said first reel shaft and said first slipping member for rotatably connecting said first reel shaft with said first slipping member so that said first reel shaft and said first slipping member are rotatable relative to each other so that said driving force of said drive means is transmitted from said first slipping member to said first reel shaft, and for controlling the rotation of said first reel shaft relative to said first slipping member according to the difference between the rotational torque produced on said first reel shaft and the rotational torque produced on said first slipping member; and a second connecting means interposed between said second reel shaft and said second slipping member for rotatably connecting said second reel shaft and said second slipping member so that said driving force of said drive means is transmitted from said second slipping member to said second reel shaft, and for controlling the rotation of said second reel shaft relative to said second slipping member according to the difference between the rotational torque produced on said second reel shaft and the rotational torque produced on said second slipping member. With this construction, a back tension of constant strength is produced on the magnetic recording tape between the supply reel shaft and the capstan, thus eliminating the cause of wow and flutter.

In the embodiment of the present invention, the chassis 26 has the movable member 80 which is movable between a first position and a second position closer to the first slipping member 64 and the second slipping member 164 than to said first position, and the swinging member 102 is swingably mounted on the movable member 80 so that said swinging member 102 is engageable with either the first slipping member 64 or the second slipping member 164 only when the movable member 80 is located at the second position.

With such a construction, since it is possible to prohibit the generation of back tension by arranging the movable member 80 at the first position, the magnetic recording tape can be fast forwarded.

In the embodiment of the present invention, the movable member 80 has the magnetic head 88 and pinch roller 86; the magnetic head 88 and the pinch roller 86 contact the magnetic recording tape 100 wound on the pair of reels 90 engaging with the first and second reel shafts 12 and 14 when the movable member 80 is at the second position, and they are separated from the magnetic recording tape 100 when the movable member 80 is at the first position.

With such a construction, the magnetic recording tape drive apparatus 10 can be made compact.

In the embodiment of the present invention, the drive means 38 is preferably a reversible motor having the same characteristics in either direction, and it is preferably of the construction wherein the driving force transmitting means 78 and 178 comprise a first engaging member 66 coaxially fixed to the first slipping member 64 and having a plurality of engaging surfaces 68 on its outer circumferential surface forming part of a spiral shape; a first engaged member 70 rotatably connected to said first slipping member 64 to be coaxial therewith, having an engaged surface 74 facing said engaging surfaces 68 of said first engaging member 66, and connected to said drive means 38 to be rotated by said driving force; balls 76 interposed between said engaging surfaces 68 of said first engaging member 66 and said engaged surface 74 of said first engaged member 70 for contacting said engaging surfaces 68 and said engaged surface 74 between the minimum diameter portion and the maximum diameter portion of said engaging surfaces when said first engaged member 70 rotates in one direction so that said first engaging member 66 is fixed to said first engaged member 70, and for slipping between said minimum diameter portion of said engaging surfaces 68 and said engaged surface 74 when said engaged member 70 rotates in the other direction; a second engaging member 166 having a plurality of engaging surfaces 168 forming a part of a spiral shape oriented oppositely to said spiral shape on its outer circumferential surface and coaxially fixed to said second slipping member 164; a second engaged member 170 mounted on said second slipping member 164 so as to be coaxial therewith, having the engaged surface 174 facing said engaging surfaces 168 of said second engaging member 166, and connected to said drive means 38 to rotate by said driving force; and balls 176 interposed between said engaging surfaces 168 of said second slipping member 164 and said engaged surface 174 of said second engaged member 170 for rotating between the minimum diameter portion of said engaging surfaces 168 and said engaged surface 174 when said second engaged member 170 rotates in said one direction, and for contacting said engaging surfaces 168 and said engaged surface 174 between said minimum diameter portion and said maximum diameter portion of said engaging surfaces 168 so that said second slipping member 164 is fixed to said second engaged member 170.

With such a construction, the space required for the driving force transmitting means to function may be made smaller, and the construction of the magnetic recording tape drive apparatus may be made more compact than the case wherein the driving force transmitting means includes an idler.

In the embodiment of the present invention, the magnetic recording tape drive apparatus 10 has a pair of capstans 16 and 18 which rotate simultaneously in the same direction at the same speed when driven by said drive means 38.

With such a construction, the travel speed of the magnetic recording tape may be kept constant during forward playback and reverse playback, if the magnetic recording tape drive apparatus is capable of reverse playback, so that the generation of wow and flutter may be prevented during reverse playback.

In the embodiment of the present invention, it is preferable that the first slipping member 64 be a ratchet wheel, and the second slipping member 164 be a ratchet wheel with its teeth oriented in the opposite direction from those of the former ratchet wheel; it is also preferable that the swinging member 102 have a shock absorbing means for absorbing shocks produced when the swinging member 102 engages with one of the former ratchet wheels.

With such a construction, it is convenient to swing the swinging member 102 by only rotating either the ratchet wheel 64 or the ratchet wheel 164. The swinging member 102, rotating in one direction or the other by the rotation of the ratchet wheel 64 or the ratchet wheel 164, will not be damaged even if it collides with the other ratchet 64 or 164. Further, since the swinging member 102 does not rebound from such a shock, the engagement of it with the appropriate racthet wheel 64 or 164 is effected with certainty.

In the embodiment of the present invention, it is preferable that the swinging member 102 be swingable at its central position on the chassis 26 and that it have the lever 104 at its respective end engaging parts engageable with either the first slipping member 64 or the second slipping member 164, and that this lever 104 be made of an elastic material.

With such a construction, the construction of the swinging member 102 may be made simpler as compared with the case wherein a shock absorbing means comprising rubber, a spring, a shock absorber or the like is combined with the lever 104.

In the embodiment of the present invention, the lever 104 is preferably made of a synthetic resin. Then, the lever 104 may be manufactured with ease and at less cost.

The specific constructions illustrated above are only for the purpose of explicating the present invention and should not be construed in a restrictive manner. It is, therefore, to be understood that various modifications can be made as long as they do not depart from the scope of the present invention.

For example, the driving force transmitting means may comprise an idler, or only one capstan may be included.

The first and second slipping members may comprise gears.

Further, the shock absorbing means may comprise rubber, a spring, a shock absorber and so on.

What is claimed is:

1. A capstan drive type magnetic recording tape apparatus comprising:
   a chassis:
   a pair of reels on which is wound a magnetic recording tape;
   a first reel shaft rotatably mounted on said chassis for engagement with and rotation with one of said pair of reels;
   a second reel shaft rotatably mounted on said chassis for engagement with and rotation with the other of said pair of reels;
   a first slipping member rotatably mounted on said first reel shaft;
   a second slipping member rotatably mounted on said second reel shaft;
   a driving force transmitting means coupled to a drive means for selectively transmitting a driving force provided by said drive means to either said first slipping member or said second slipping member to cause said recording tape to travel in one or the other directions;
   a swinging member swingably mounted to said chassis for prohibiting rotation of said first slipping member by engaging said first slipping member when said magnetic recording tape is traveling in one direction and for prohibiting rotation of said second slipping member by engaging said second slipping member when said magnetic recording tape is traveling in the other direction;
   a first connecting means interposed between said first reel shaft and said first slipping member for rotatably connecting said first reel shaft with said first slipping member so as to transmit said driving force from said first slipping member to said first reel shaft, and for controlling the rotation of said first reel shaft relative to said first slipping member according to the difference between the rotational torque produced on said first reel shaft and the rotational torque produced on said first slipping member; and
   a second connecting means interposed between said second reel shaft and said second slipping member for rotatably connecting said second reel shaft and said second slipping member so as to transmit said driving force from said second slipping member to said second reel shaft, and for controlling the rotation of said second reel shaft relative to said second slipping member according to the difference between the rotational torque produced on said second reel shaft and the rotational torque produced on said second slipping 2. A capstan drive type magnetic recording tape drive apparatus of claim 1 wherein said chassis includes a movable member which is movable between a first position and a second position at which said movable member is closer to said first slipping member and said second slipping member than at said first position, and said swinging member is swingable with respect to said movable member so as to be engageable with either said first slipping member or said second slipping member only when said movable member is at said second position.

3. A capstan drive type magnetic recording tape drive apparatus of claim 2 wherein said movable member includes a magnetic head and a pinch roller, said magnetic head and said pinch roller contacting said magnetic recording tape wound on said pair of reels engaged with said first and second reel shafts when said movable member is at said second position and being separated from said magnetic recording tape when said movable member is at said first position.

4. A capstan drive type magnetic recording tape drive apparatus of claim 3 wherein said drive means comprises a motor rotatable in one or the other direction with the same characteristics, and said driving force transmitting means comprises:

a first engaging member coaxially fixed to said first slipping member and having a plurality of engaging surfaces forming part of a spiral shape;

a first engaged member rotatably coaxially mounted on said first slipping member, having an engaged surface facing said engaging surfaces of said first engaging member, and coupled to said drive means to be rotated by said driving force;

balls interposed between said engaging surfaces of said first engaging member and said engaged surface of said first engaged member for contacting with said engaging surfaces and said engaged surface between minimum diameter portions and maximum diameter portions of said engaging surfaces for securing said first engaging member to said first engaged member when said first engaging member rotates in one direction, and for slipping between said engaging surfaces and said engaged surface when said first engaging member rotates in the other direction;

a second engaging member coaxially fixed to said second slipping member and having a plurality of engaging surfaces forming part of a spiral shape of opposite configuration from said spiral shape of said first engaging member;

a second engaged member rotatably coaxially mounted on said second slipping member, having an engaged surface facing said engaging surfaces of said second engaging member, and coupled to said drive means to be rotated by said driving force; and balls interposed between said engaging surfaces of said second slipping member and said engaged surface of said second engaged member for slipping between a minimum diameter portion and a maximum diameter portion of said engaging surfaces when said second engaged member rotates in one direction, and for contacting said engaging surfaces and said engaged surface between said minimum diameter portion and said maximum diameter portion when said second engaged member rotates in the other direction.

5. A capstan drive type magnetic recording tape drive apparatus of claim 3 further comprising a pair of capstans which are rotatably mounted on said chassis, and means coupling said capstans to said drive means for rotating said capstans simultaneously at the same speed by said drive means.

6. A capstan drive type magnetic recording tape drive apparatus of any one of claims 1 to 5 wherein said first slipping member comprises a ratchet wheel, said second slipping member comprises ratchet wheel with teeth oriented oppositely to those of said first slipping member ratchet wheel, and said swinging member includes shock absorbing means for absorbing shocks generated when said swinging member engages with one of said ratchet wheels.

7. A capstan drive type magnetic recording tape drive apparatus of claim 6 wherein said swinging member is swingable at its central position on said chassis and includes a lever which in turn has at its respective ends engaging parts engageable with either said first slipping member or said second slipping member, said lever being made of an elastic material.

8. A capstan drive tape magnetic recording tape drive apparatus of claim 7 wherein said lever is made of a synthetic resin.

* * * * *